(12) United States Patent
Stauder et al.

(10) Patent No.: US 11,245,300 B2
(45) Date of Patent: Feb. 8, 2022

(54) ELECTRIC MACHINE

(71) Applicant: VITESCO TECHNOLOGIES GMBH, Hannover (DE)

(72) Inventors: Peter Stauder, Mainz (DE); Bernhardt Lueddecke, Nuremberg (DE); Lars Vornweg, Menden (DE); Nam Anh Dinh, Frankfurt am Main (DE); Dominik Just, Kronau (DE)

(73) Assignee: Vitesco Technologies GmbH, Hannover (DE)

( * ) Notice: Subject to any disclaimer, the term of this patent is extended or adjusted under 35 U.S.C. 154(b) by 121 days.

(21) Appl. No.: 16/648,298

(22) PCT Filed: Aug. 7, 2018

(86) PCT No.: PCT/EP2018/071397
§ 371 (c)(1),
(2) Date: Mar. 18, 2020

(87) PCT Pub. No.: WO2019/057383
PCT Pub. Date: Mar. 28, 2019

(65) Prior Publication Data
US 2020/0287435 A1 Sep. 10, 2020

(30) Foreign Application Priority Data
Sep. 20, 2017 (DE) .............................. 102017216631

(51) Int. Cl.
*H02K 3/28* (2006.01)
*H02K 1/16* (2006.01)
(Continued)

(52) U.S. Cl.
CPC .................. *H02K 3/28* (2013.01); *H02K 1/16* (2013.01); *H02K 1/18* (2013.01); *H02K 3/12* (2013.01); *H02K 3/522* (2013.01)

(58) Field of Classification Search
None
See application file for complete search history.

(56) References Cited

U.S. PATENT DOCUMENTS

| | | | | |
|---|---|---|---|---|
| 3,588,888 A | * | 6/1971 | Harden | H02K 37/14 340/319 |
| 3,956,651 A | * | 5/1976 | Brammerlo | H02K 1/12 310/216.024 |

(Continued)

FOREIGN PATENT DOCUMENTS

| | | |
|---|---|---|
| DE | 102013207469 A1 | 11/2014 |
| FR | 3005219 A1 | 10/2014 |

(Continued)

*Primary Examiner* — Robert W Horn
(74) *Attorney, Agent, or Firm* — Laurence A. Greenberg; Werner H. Stemer; Ralph E. Locher

(57) ABSTRACT

An electric machine includes an annular stator and a rotor disposed within the stator. The stator has a multiplicity of stator segments in a circumferential direction. Each of the stator segments has one or more inner grooves, disposed in the region of the inner circumference of the stator segment, and a winding window which is disposed in the region of the outer circumference of the stator segment. A stator winding is wound in toroidal fashion around the stator segment. The winding window is partially surrounded at its radial outer side by stator segment outer arms in such a way that a radially directed outer gap extending from the winding window to the outer circumference of the stator segment is formed between the stator segment outer arms.

13 Claims, 3 Drawing Sheets

(51) Int. Cl.
*H02K 1/18* (2006.01)
*H02K 3/12* (2006.01)
*H02K 3/52* (2006.01)

(56) References Cited

U.S. PATENT DOCUMENTS

| | | | | |
|---|---|---|---|---|
| 4,103,197 | A * | 7/1978 | Ikegami | H01F 3/14 |
| | | | | 310/208 |
| 4,547,713 | A | 10/1985 | Langley et al. | |
| 4,563,606 | A * | 1/1986 | Fukasawa | H02K 3/12 |
| | | | | 310/164 |
| 5,044,897 | A * | 9/1991 | Dorman | H02K 29/08 |
| | | | | 417/423.7 |
| 5,334,899 | A * | 8/1994 | Skybyk | H02K 1/2793 |
| | | | | 310/114 |
| 6,177,746 | B1 * | 1/2001 | Tupper | H02K 7/025 |
| | | | | 310/114 |
| 6,211,595 | B1 * | 4/2001 | Nose | G11B 19/2009 |
| | | | | 310/164 |
| 6,236,135 | B1 * | 5/2001 | Suzuki | H02K 3/46 |
| | | | | 310/162 |
| 6,700,271 | B2 * | 3/2004 | Detela | H02K 7/088 |
| | | | | 310/164 |
| 6,924,574 | B2 | 8/2005 | Qu et al. | |
| 7,023,121 | B2 * | 4/2006 | Kusase | H02K 1/16 |
| | | | | 310/156.66 |
| 7,145,280 | B2 * | 12/2006 | Noble | H02K 1/06 |
| | | | | 310/254.1 |
| 7,701,101 | B2 * | 4/2010 | Al-Khayat | H02K 21/24 |
| | | | | 310/179 |
| 7,768,157 | B2 * | 8/2010 | Takeuchi | H02K 41/03 |
| | | | | 310/12.21 |
| 7,932,650 | B2 * | 4/2011 | Seki | H02K 3/46 |
| | | | | 310/71 |
| 7,965,014 | B2 | 6/2011 | Shinagawa et al. | |
| 8,035,265 | B2 | 10/2011 | Seki et al. | |
| 8,253,299 | B1 * | 8/2012 | Rittenhouse | B62M 6/65 |
| | | | | 310/257 |
| 8,258,665 | B2 * | 9/2012 | Edelson | H02K 3/28 |
| | | | | 310/179 |
| 9,171,692 | B2 * | 10/2015 | Baral | H02K 1/148 |
| 9,673,675 | B2 * | 6/2017 | Lucchi | H02K 1/141 |
| 9,698,648 | B2 * | 7/2017 | Tashiro | H02K 9/22 |
| 9,912,203 | B2 * | 3/2018 | Lucchi | H02K 1/24 |
| 10,044,250 | B2 * | 8/2018 | Seki | H02K 3/28 |
| 2005/0236920 | A1 | 10/2005 | Kusase et al. | |
| 2009/0091204 | A1 | 4/2009 | Koshiba et al. | |
| 2012/0161361 | A1 * | 6/2012 | Ghelardi | H02K 15/12 |
| | | | | 264/272.13 |
| 2015/0180298 | A1 | 6/2015 | Horst | |
| 2016/0168775 | A1 | 6/2016 | Kim et al. | |
| 2016/0226322 | A1 | 8/2016 | Li et al. | |
| 2018/0041083 | A1 * | 2/2018 | Centner | H02K 1/16 |
| 2020/0144875 | A1 * | 5/2020 | Umeda | H02K 1/18 |
| 2020/0287427 | A1 * | 9/2020 | Stauder | H02K 1/148 |
| 2020/0287435 | A1 * | 9/2020 | Stauder | H02K 3/12 |

FOREIGN PATENT DOCUMENTS

| | | |
|---|---|---|
| JP | S5970155 A | 4/1984 |
| JP | 2001103688 A | 4/2001 |
| WO | 2007043506 A1 | 4/2007 |
| WO | 2015002453 A1 | 1/2015 |

\* cited by examiner

ELECTRIC MACHINE

BACKGROUND OF THE INVENTION

Field of the Invention

The invention relates to an electric machine which has an annular stator and a rotor arranged within the stator.

Such an electric machine is used for example in an electric compressor of a turbocharger of an internal combustion engine. A compressor which is provided for the supercharging of the internal combustion engine must be operated at very high rotational speeds owing to the efficiency of the aerodynamics. These lie in a range from approximately 70 000 revolutions per minute to 150 000 revolutions per minute.

It is already known to design the stator winding of an electric machine as a concentrated winding, in the case of which the coils are each wound around a stator tooth. This makes a compact design possible, but generates a stator magnetic field with a high spatial harmonic content. This in turn causes high ohmic losses in the rotor of the electric machine owing to eddy currents.

It is also already known to realize the stator winding of an electric machine as a distributed winding. Such a distributed winding replicates a sine wave more effectively than a concentrated winding. If the stator winding is realized as a distributed winding, the eddy currents are significantly reduced. However, distributed windings are usually produced using the pull-in technique or plugged together from individual conductors using the so-called hairpin technique and subsequently welded. In both of the above cases, a comparatively large amount of space is required for the end windings, since the conductors have to be guided past one another during the winding construction process.

DE 10 2013 207 469 A1 has disclosed an electric machine which has an annular stator and a rotor arranged within the stator. The stator has a stator iron. This in turn has a stator yoke and stator teeth. Furthermore, the stator has a stator winding which runs in toroidal fashion around the stator yoke, wherein the stator yoke has an inner groove provided on the inner circumference of the stator yoke, and an outer groove provided on the outer circumference of the stator yoke, for receiving the stator winding. Furthermore, potting is provided on the stator winding in such a way that the stator winding is thermally connected to the stator iron by the potting.

SUMMARY OF THE INVENTION

This object is achieved by means of an electric machine having the features specified in below. Advantageous embodiments and refinements of the invention are specified in the dependent claims.

This object is achieved by means of an electric machine having the features specified in claim 1. Advantageous embodiments and refinements of the invention are specified in the dependent claims.

An electric machine according to the invention has an annular stator and a rotor arranged within the stator, wherein the stator has a multiplicity of stator segments in a circumferential direction, wherein each of the stator segments has one or more inner grooves, arranged in the region of the inner circumference of the stator segment, and a winding window which is arranged in the region of the outer circumference of the stator segment, wherein a stator winding is wound in toroidal fashion around the stator segment, and wherein the winding window is partially surrounded at its radial outer side by stator segment outer arms such that a radially directed outer gap extending from the winding window to the outer circumference of the stator segment is formed in the region between the stator segment outer arms.

The advantages of the invention consist in particular in that the winding inductance that is coupled to the rotor of the electric machine can be kept small, such that the rotor is exposed to only relatively small harmonic amplitudes of the stator magnetic field in relation to the prior art. These advantages of the invention are made possible in that, by means of the features of the invention, the return conductors of the stator winding running outside the stator are used to provide an additional inductance, the B field of which is independent of the rotor, that is to say follows a path which does not lead along the rotor and also does not lead through the latter. The desired inductance can advantageously be set through suitable selection of the length and the width of the outer gap according to the invention, which is provided between the two stator segment outer arms and extends in the radial direction.

Advantageous embodiments and refinements of the invention are specified in the dependent claims.

DETAILED DESCRIPTION OF THE INVENTION

Figure 1:
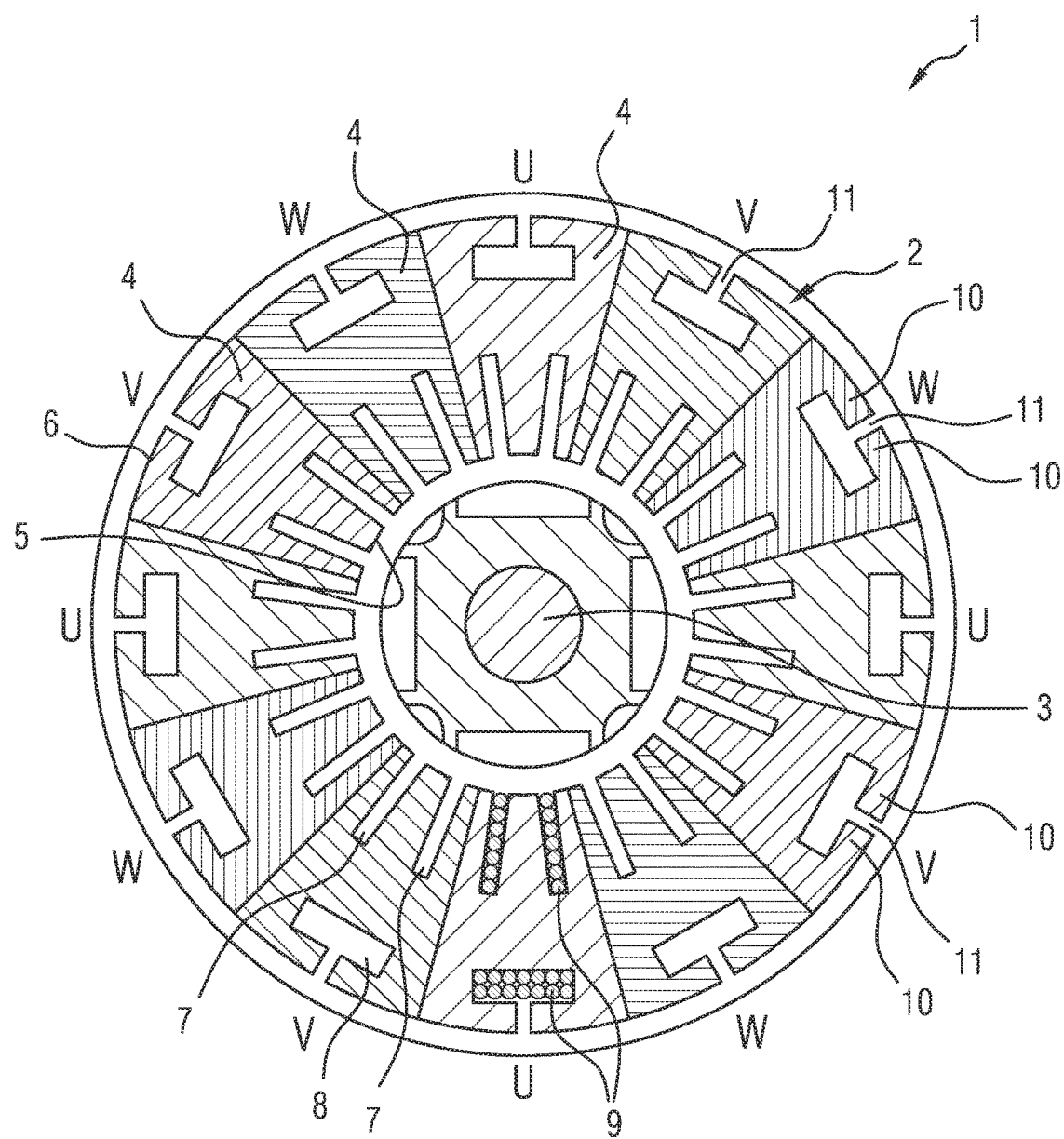
FIG. 1 shows a diagram for illustrating a first exemplary embodiment of an electric machine according to the invention.

FIG. 1 shows a diagram for illustrating a first exemplary embodiment of an electric machine according to the invention.

The electric machine 1 shown in FIG. 1 has an annular stator 2 and a rotor 3 arranged within the stator. The stator 2 has a multiplicity of stator segments 4 in the circumferential direction. Each of these stator segments 4 is assigned to one of the phases U, V or W of the alternating-current system. Consequently, the stator segments are designated by the letters U, V or W in FIG. 1. In the exemplary embodiment shown, each of these stator segments 4 has two inner grooves 7 which are arranged in the region of the inner circumference 5 of the respective stator segment and which each extend in a radial direction. Furthermore, each of the stator segments 4 has, in the region of its outer circumference 6, a winding window 8 whose longitudinal direction extends in the circumferential direction of the stator. The inner grooves 7 and the winding window 8 of each stator segment 4 serve for receiving the stator winding 9, which is wound toroidally around the respective stator segment.

The winding window 8 of each stator segment 4 is partially surrounded at its radial outer side by stator segment outer arms 10 such that a radially directed outer gap 11 extending from the winding window 8 to the outer circumference 6 of the respective stator segment 4 is formed between the stator segment outer arms 10.

The length and the width of this outer gap 11 are selected such that an additional magnetic circuit is formed in the region outside the stator, which additional magnetic circuit has a predefined inductance determined by the length and the width of the outer gap 11. Consequently, a magnetic field of desired size can be built up outside the stator through suitable selection of the length and the width of the outer gap 11. This magnetic field formed outside the stator has no influence on the rotor 3, arranged inside the stator 2, of the electric machine, so that the B field or the associated harmonic amplitudes of the additional magnetic field have no undesired effects on the rotor.

In the first exemplary embodiment shown in FIG. 1, the outer gap 11 extends radially outward from the central region, in the circumferential direction, of the winding window 8 to the outer circumference 6 of the respective stator segment 4. Consequently, in this exemplary embodiment, the stator segment outer arms 10 have the same length in the circumferential direction of the respective stator segment 4.

The electric machine 1 illustrated in FIG. 1 is a four-pole machine, for which a stator 2 is used which has a total of 24 inner grooves 7 on its inner circumference 5. This stator has a total of 12 stator segments 4. Four of these stator segments are assigned to the phase U, four more of the stator segments are assigned to the phase V and the four remaining stator segments are assigned to the phase W. Each stator segment 4 has two inner grooves 7 and a winding window 8, wherein the stator winding associated with the respective stator segment is wound in toroidal fashion around the stator segment, wherein the winding window is dimensioned such that it can accommodate twice the number of conductors compared to the two inner grooves of the stator segment.

Owing to the additional magnetic circuit formed outside the stator, the stator magnetic field which is formed within the stator and which is coupled to the rotor of the electric machine can be kept small, such that the influence of the harmonic amplitudes from the magnetic field formed within the stator on the rotor is kept low.

Figure 2:
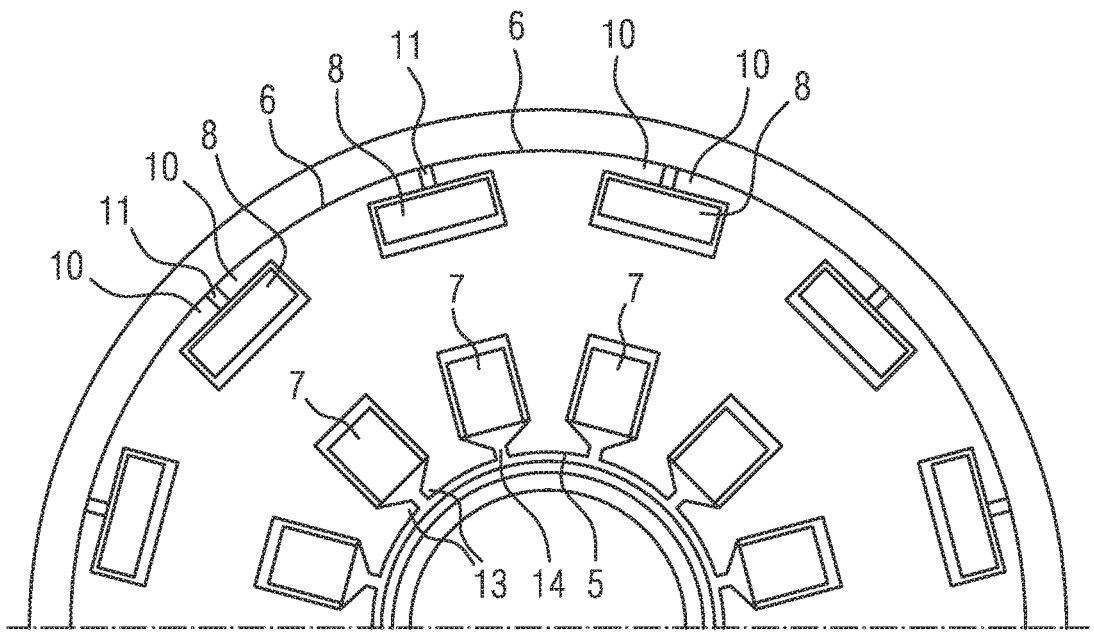
FIG. 2 shows a diagram for illustrating a second exemplary embodiment of an electric machine according to the invention.

FIG. 2 shows a diagram for illustrating a second exemplary embodiment of an electric machine according to the invention.

In this second exemplary embodiment, too, the stator has a multiplicity of stator segments in the circumferential direction. However, in this exemplary embodiment, by contrast to the first exemplary embodiment, each of these stator segments is assigned only one inner groove 7 arranged in the region of the inner circumference of the stator segment. In the region of the outer circumference of the respective stator segment, each stator segment has a winding window 8. Here, too, the stator winding associated with the respective stator segment is wound toroidally around the stator segment. Furthermore, in this exemplary embodiment, too, the winding window 8 is partially surrounded at its radial outer side by stator segment outer arms 10 such that a radially directed outer gap 11 extending from the winding window 8 to the outer circumference 6 of the respective stator segment is formed between the stator segment outer arms.

The second exemplary embodiment differs from the first exemplary embodiment shown in FIG. 1 also in that the inner grooves 7 of the respective stator segment 4 do not end directly at the inner circumference 5 of the respective stator segment 4, but are spaced apart from this inner circumference 5. Thus, these inner grooves are partially surrounded at their radial inner side by stator segment inner arms 13 in such a way that a radially directed inner gap 14 extending from the inner groove 7 to the inner circumference 5 of the respective stator segment 4 is formed between the stator segment inner arms 13.

The advantage of this embodiment is that only small reluctance differences arise at the inner circumference of the stator in the circumferential direction. This results in lower losses in the rotor.

It can also be seen from FIG. 2 that, in this exemplary embodiment, the inner gap 14 is widened in the circumferential direction in its transition region to the inner groove 7 of the respective stator segment.

Figure 3:
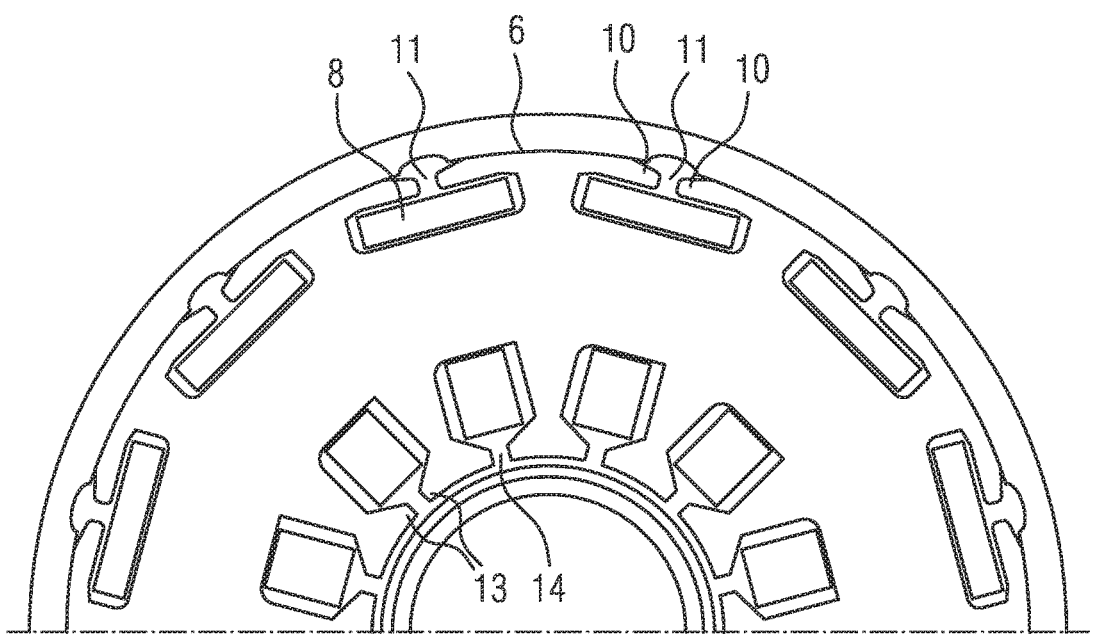
FIG. 3 shows a diagram for illustrating a third exemplary embodiment of an electric machine according to the invention.

FIG. 3 shows a diagram for illustrating a third exemplary embodiment of an electric machine according to the invention. This third exemplary embodiment differs from the second exemplary embodiment shown in FIG. 2 only in that the outer gap 11 is widened in the circumferential direction in its transition region to the outer circumference 6 of the stator segment 4. This widening in the circumferential direction has the advantage that the flow through the electrically conductive housing material surrounding the stator is reduced. This also reduces the eddy current losses.

Figure 4:
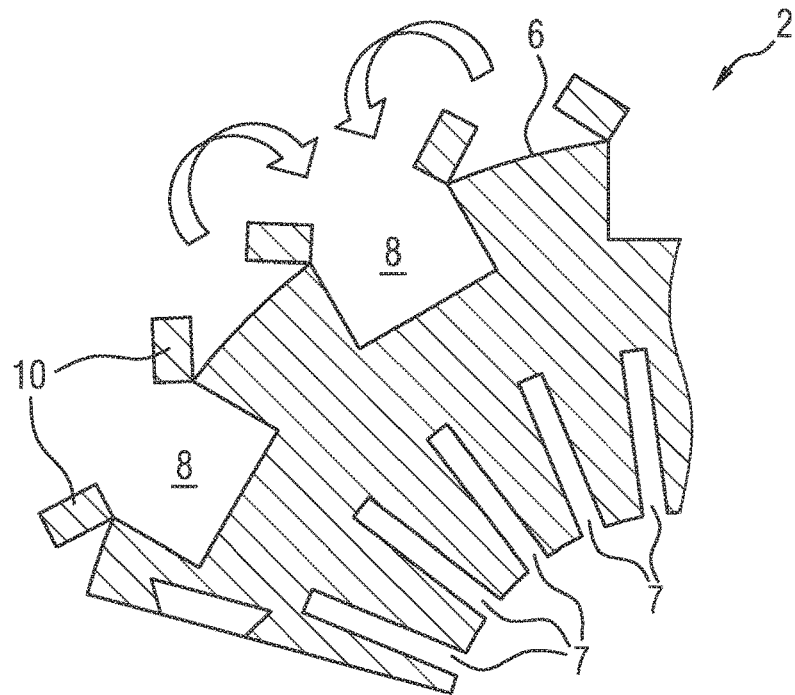
FIG. 4 shows a diagram for illustrating an embodiment of the invention.

FIG. 4 shows a diagram for explaining an embodiment of the invention.

This diagram illustrates a part of the stator 2 of the electric machine 1. In this embodiment, as in the first exemplary embodiment shown in FIG. 1, each stator segment has two inner grooves 7 arranged in the region of the inner circumference of the stator segment and has a winding window 8 arranged in the region of the outer circumference of the stator segment. In this exemplary embodiment, too, the winding window 8 is partially surrounded at its radial outer side by stator segment outer arms 10 such that a radially directed outer gap extending from the winding window 8 to the outer circumference 6 of the respective stator segment is formed between the stator segment outer arms. In the embodiment shown in FIG. 4, by contrast to the first exemplary embodiment shown in FIG. 1, the stator segment outer arms 10 are designed such that they can be folded over, wherein the stator segment outer arms 10 are shown in a first end position in FIG. 4. This first end position is the folded-open position of the stator segment outer arms. In this folded-open position of the stator segment outer arms 10, the winding window 8 is opened up, such that the winding process of the stator winding is simplified. In their second end position, not shown in FIG. 4, the stator segment outer arms 10 are in their folded-closed position. In this folded-closed end position of the stator segment outer arms 10, the outer gap 11 extending radially outward from the winding window 8 is kept free.

A design of the stator segment outer arms such that they can be folded over may also be used in electric machines according to the invention which have a different number of inner grooves per stator segment.

Figure 5:
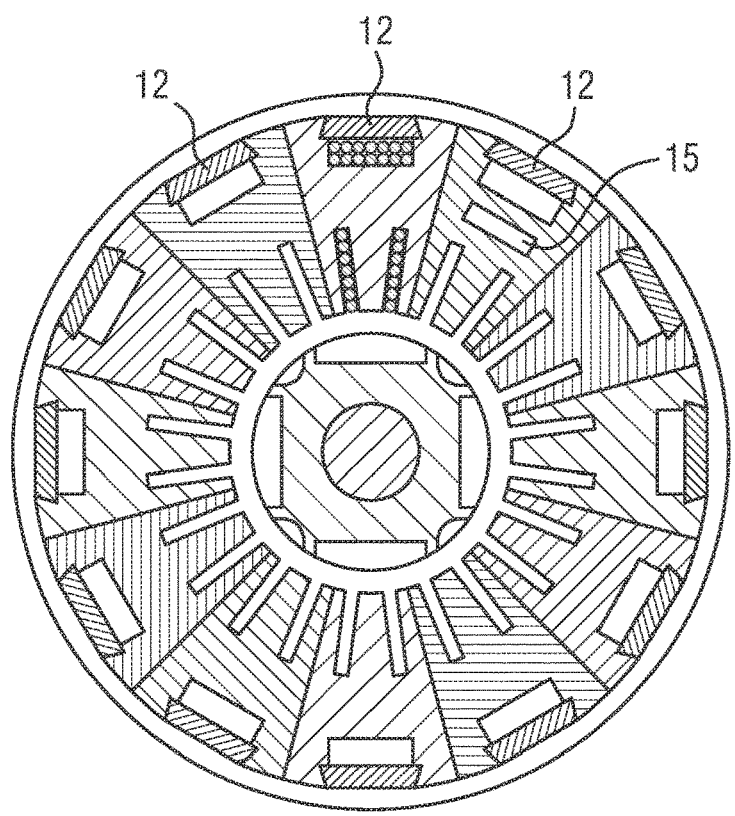
FIG. 5 shows a diagram for illustrating another embodiment of the invention.

FIG. 5 shows a diagram of another embodiment of the invention.

This other embodiment illustrated in FIG. 5 substantially corresponds to the first exemplary embodiment shown in FIG. 1. In this other embodiment, as in the first exemplary embodiment shown in FIG. 1, each stator segment has two inner grooves 7 arranged in the region of the inner circumference of the stator segment and has a winding window 8 arranged in the region of the outer circumference of the stator segment. In this other embodiment, too, the winding window 8 is partially surrounded at its radial outer side by stator segment outer arms such that a radially directed outer gap extending from the winding window to the outer circumference of the respective stator segment is formed between the stator segment outer arms.

In the other embodiment shown in FIG. 5, by contrast to the first exemplary embodiment shown in FIG. 1 and also by contrast to the embodiment shown in FIG. 4, bridges 12 are mounted onto the stator outer arms. These bridges 12 are designed such that the outer gap extending from the winding window to the outer circumference of the respective stator segment is kept free. The bridges 12 are preferably composed of iron powder or MPP core material.

A further difference of this other embodiment in relation to the first exemplary embodiment shown in FIG. 1 and also in relation to the embodiment shown in FIG. 4 is that the stator segments have an iron powder or MPP core in the region between the inner grooves 7 and the winding window 8. This reduces the losses of the electric machine.

The use of such an iron powder or MPP core in the region between the inner grooves 7 and the winding window 8 can also be used in electric machines according to the invention which have a different number of inner grooves per stator segment.

An advantageous embodiment of the invention consists in equipping the electric machine with an additional winding, which serves as a sensor winding, in the region of the inner circumference of the stator segments. This additional winding is preferably a distributed winding composed of a very thin wire.

The stator winding may be a coil wound as one strand. Alternatively, the stator winding may also be a coil that is not wound as one strand.

Furthermore, the stator winding may be realized in the form of a delta connection or a star connection.

The electric machine may be a four-pole or a two-pole electric machine.

The segments of the stator may be connected to one another using the dovetail technique. Alternatively, it is also possible to weld the segments of the stator together. A further alternative is to connect the segments of the stator to one another by means of plastics injection molding. Alternatively, instead of a dovetail connection, any other "puzzle geometry" may also be used to connect the stator segments.

The complete stator may advantageously be enclosed by a potting composed of a thermally conductive material for the purposes of better heat dissipation.

Furthermore, in each case one insulation layer may be introduced between adjacent stator segments in order to prevent an occurrence of short circuits between adjacent lamination layers and an occurrence of eddy currents.

The invention claimed is:

1. An electric machine, comprising:
an annular stator and a rotor disposed within said stator;
said stator having a multiplicity of stator segments disposed in a circumferential direction;
each of said stator segments having an inner circumference, an outer circumference, at least one inner groove disposed in a region of said inner circumference and a winding window disposed in a region of said outer circumference, said winding window having a radial outer side;
each of said stator segments having stator segment outer arms partially surrounding said winding window at said radial outer side and forming a radially directed outer gap disposed between said stator segment outer arms and extending from said winding window to said outer circumference of said stator segment; and
each of said stator segments having a stator winding wound toroidally around said stator segment.

2. The electric machine according to claim 1, wherein said outer gap has a length and a width selected to form an additional magnetic circuit of predefined inductance in a region outside said stator.

3. The electric machine according to claim 2, wherein said stator segment outer arms have identical lengths in a circumferential direction of said stator segment.

4. The electric machine according to claim 2, wherein said outer gap extends radially outward from a central region in a circumferential direction of said winding window to said outer circumference of said stator segment.

5. The electric machine according to claim 1, wherein said outer gap is widened in said circumferential direction in a transition region to said outer circumference of said stator segment.

6. The electric machine according to claim 1, wherein:
said stator segment outer arms are configured to be folded over between:
a first end position in which said stator segment outer arms are folded open and open up said winding window, and
a second end position in which said stator segment outer arms are folded closed; and
said outer gap extending from said winding window to said outer circumference of said stator segment is kept free in said folded-closed end position.

7. The electric machine according to claim 1, which further comprises a bridge mounted onto said stator segment outer arms for keeping said outer gap, extending from said winding window to said outer circumference of said stator segment, free.

8. The electric machine according to claim 7, wherein said bridge is formed of iron powder or MPP core material.

9. The electric machine according to claim 1, which further comprises stator segment inner arms partially surrounding radial inner sides of each of said inner grooves to form a radially directed inner gap disposed between said stator segment inner arms and extending from said inner groove to said inner circumference of said stator segment.

10. The electric machine according to claim 9, wherein said stator segment inner arms have identical lengths in said circumferential direction of said stator segment.

11. The electric machine according to claim 9, wherein said inner gap is widened in said circumferential direction in a transition region to said inner groove of said stator segment.

12. The electric machine according to claim 1, which further comprises an iron powder or MPP core disposed in a region between said inner groove of a stator segment and said winding window of said stator segment.

13. The electric machine according to claim 1, which further comprises an additional winding disposed in a region of said inner circumference of said stator segments, said additional winding serving as a sensor winding.

* * * * *